United States Patent
Schroder

(10) Patent No.: US 10,094,472 B2
(45) Date of Patent: Oct. 9, 2018

(54) PISTON RING SEALING FOR PNEUMATIC ACTUATOR

(71) Applicant: Hamilton Sundstrand Corporation, Windsor Locks, CT (US)

(72) Inventor: Bruce R. Schroder, Agawam, MA (US)

(73) Assignee: HAMILTON SUNDSTRAND CORPORATION, Windsor Locks, CT (US)

(*) Notice: Subject to any disclaimer, the term of this patent is extended or adjusted under 35 U.S.C. 154(b) by 472 days.

(21) Appl. No.: 14/741,717

(22) Filed: Jun. 17, 2015

(65) Prior Publication Data

US 2016/0369894 A1    Dec. 22, 2016

(51) Int. Cl.

| F16J 1/09 | (2006.01) |
| F16J 9/08 | (2006.01) |
| F16J 9/20 | (2006.01) |
| F16J 9/22 | (2006.01) |
| F15B 15/14 | (2006.01) |
| B23P 15/10 | (2006.01) |
| F16J 9/12 | (2006.01) |

(52) U.S. Cl.
CPC ............... *F16J 9/08* (2013.01); *B23P 15/10* (2013.01); *F15B 15/1452* (2013.01); *F16J 1/09* (2013.01); *F16J 9/12* (2013.01); *F16J 9/20* (2013.01); *F16J 9/22* (2013.01)

(58) Field of Classification Search
CPC . F16J 9/08; F16J 1/09; F16J 9/12; F16J 9/20; F16J 15/16; B23P 15/10
USPC .................... 92/182; 277/552, 558
See application file for complete search history.

(56) References Cited

U.S. PATENT DOCUMENTS

| 2,244,166 | A | | 4/1938 | Marien et al. | |
| 2,414,013 | A | | 1/1947 | Bowers | |
| 4,207,800 | A | | 6/1980 | Homuth | |
| 4,582,328 | A | | 4/1986 | Howarth | |
| 5,083,536 | A | * | 1/1992 | Ariga | F16J 9/08 |
| | | | | | 123/193.6 |
| 6,176,492 | B1 | | 1/2001 | Sawai | |
| 7,415,961 | B1 | | 8/2008 | Chen et al. | |

(Continued)

FOREIGN PATENT DOCUMENTS

| CN | 203703104 | | 7/2014 |
| DE | 102013005711 | A1 | 10/2014 |

(Continued)

OTHER PUBLICATIONS

European Search Report, Application No./Patent No. 16175059.1-1751, dated Aug. 24, 2016, European Patent Office; European Search Report 7 pages.

*Primary Examiner* — Thomas E Lazo
*Assistant Examiner* — Daniel Collins
(74) *Attorney, Agent, or Firm* — Cantor Colburn LLP

(57) ABSTRACT

A piston configuration is provided, the configuration including a piston having a ring seat and a piston ring disposed within the ring seat. The piston ring is configured to form a sealing surface between a surface of the piston ring and a surface of the ring seat. The sealing surface is formed when a first pressure on a first side of the piston ring is greater than a second pressure on a second side of the piston ring. At least one fluid channel is configured to increase a surface area on the piston ring that is subject to the second pressure.

17 Claims, 6 Drawing Sheets

(56) References Cited

U.S. PATENT DOCUMENTS

| | | | |
|---|---|---|---|
| 7,757,599 B2 | 7/2010 | Adolfsson | |
| 8,177,237 B2 | 5/2012 | Lindner-Silwester et al. | |
| 8,327,752 B2 | 12/2012 | Varanasi et al. | |
| 2012/0080854 A1* | 4/2012 | Slack | F16J 15/56 277/500 |
| 2014/0260958 A1 | 9/2014 | Labrie et al. | |
| 2014/0352647 A1 | 12/2014 | Linke | |

FOREIGN PATENT DOCUMENTS

| | | |
|---|---|---|
| GB | 2370091 | 6/2002 |
| JP | 63176873 A | 7/1988 |
| JP | H11201283 | 7/1999 |
| KR | 20030058481 | 7/2003 |
| WO | 2010142022 | 12/2010 |

* cited by examiner

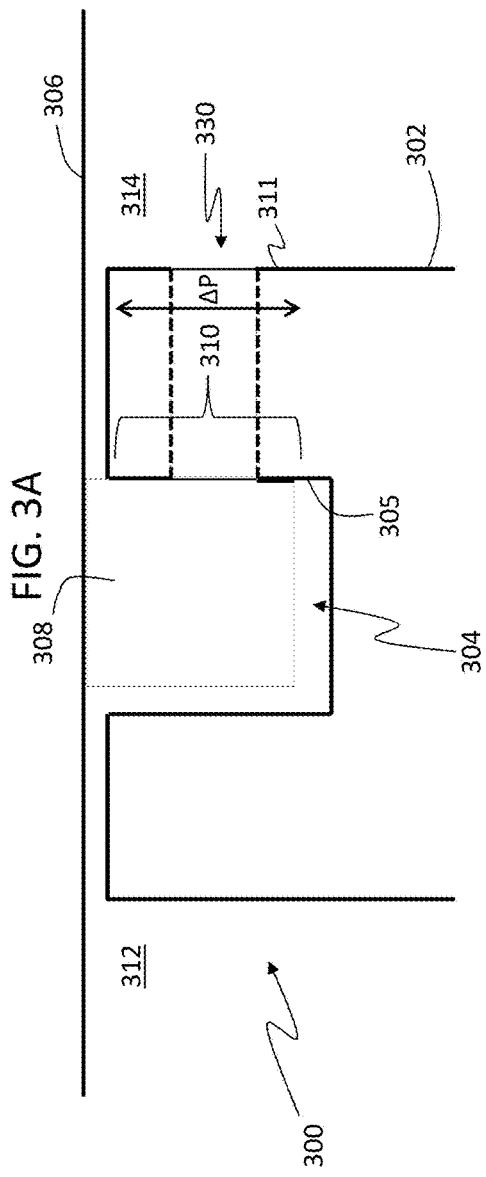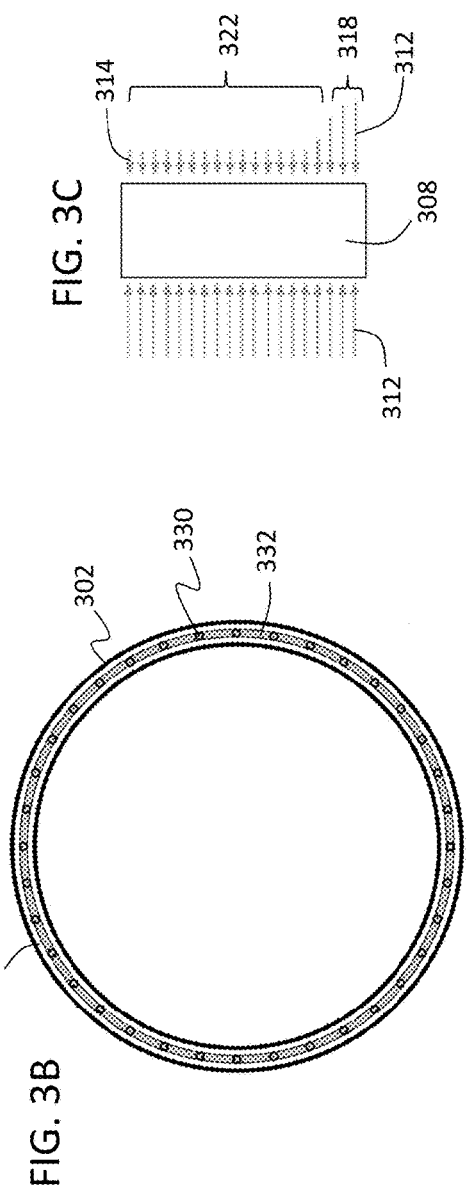

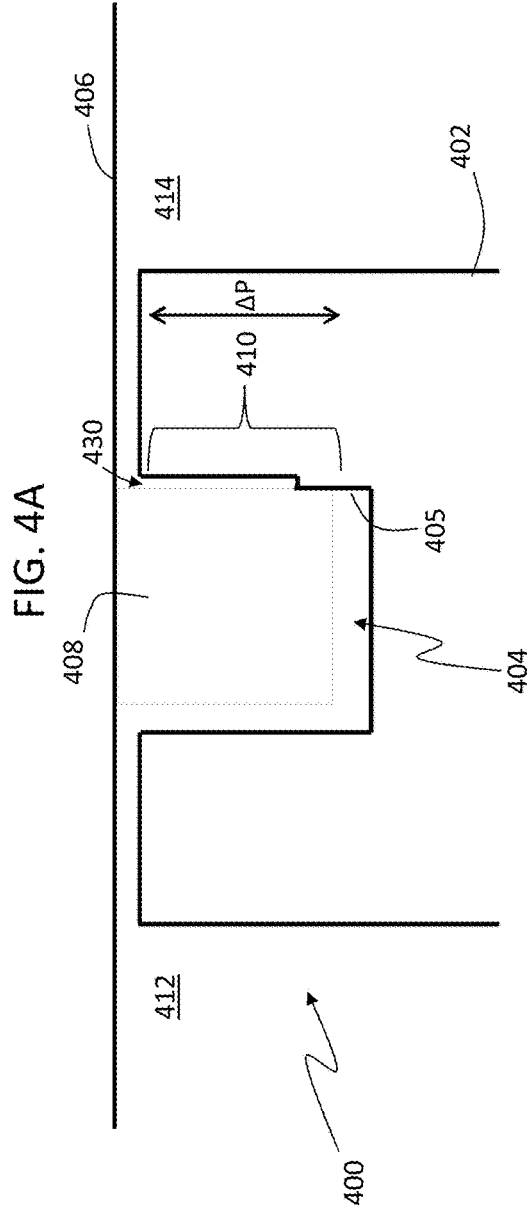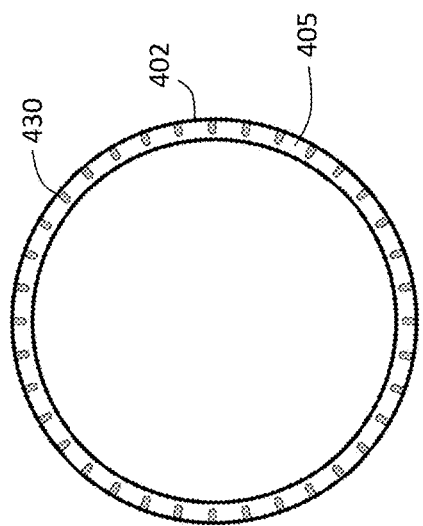

PISTON RING SEALING FOR PNEUMATIC ACTUATOR

BACKGROUND

The subject matter disclosed herein generally relates to pneumatic actuators and, more particularly, to improved piston ring sealing for pneumatic actuators.

High temperature pneumatic valves often use piston rings for sealing. Due to friction and acceleration forces acting on the piston ring, it can be difficult to maintain a sufficient axial force margin to keep the piston ring loaded against a sealing surface of the piston. If the seal is not maintained, air may leak through and/or around the piston ring. Small amounts of intermittent air leakage across the piston ring can lead to control instabilities.

SUMMARY

According to one embodiment a piston configuration is provided. The configuration includes a piston having a ring seat and a piston ring disposed within the ring seat. The piston ring is configured to form a sealing surface between a surface of the piston ring and a surface of the ring seat. The sealing surface is formed when a first pressure on a first side of the piston ring is greater than a second pressure on a second side of the piston ring. At least one fluid channel is configured to increase a surface area on the piston ring that is subject to the second pressure.

In addition to one or more of the features described above, or as an alternative, further embodiments may include that the at least one fluid channel is an aperture that extends axially through a portion of the piston.

In addition to one or more of the features described above, or as an alternative, further embodiments may include that the at least one fluid channel is a groove that extends radially along a surface of the ring seat.

In addition to one or more of the features described above, or as an alternative, further embodiments may include that the at least one fluid channel is a groove that extends radially along a surface of the piston ring.

In addition to one or more of the features described above, or as an alternative, further embodiments may include that the at least one fluid channel is formed in one of the piston and the piston ring.

In addition to one or more of the features described above, or as an alternative, further embodiments may include a circumferential channel formed in the same of the piston and the piston ring as the at least one fluid channel, the circumferential channel configured increase a surface area on the piston ring that is subject to the second pressure.

In addition to one or more of the features described above, or as an alternative, further embodiments may include a circumferential channel formed in the other of the piston and the piston ring from the at least one fluid channel, the circumferential channel configured increase a surface area on the piston ring that is subject to the second pressure.

According to another embodiment, a piston system is provided. The system includes a piston wall defining an interior chamber and a piston located within the piston wall and dividing the interior chamber into a first chamber and a second chamber, the first chamber having a first pressure and located on a first side of the piston and the second chamber having a second pressure located on a second side of the piston, the piston having a ring seat located adjacent to the piston wall and the first pressure being greater than the second pressure. A piston ring is disposed within the ring seat and configured to form a seal between the piston ring, the piston wall, and the ring seat. At least one fluid channel is configured to increase a surface area on the piston ring that is subject to the second pressure.

In addition to one or more of the features described above, or as an alternative, further embodiments may include that the at least one fluid channel is an aperture that extends axially through a portion of the piston.

In addition to one or more of the features described above, or as an alternative, further embodiments may include that the at least one fluid channel is a groove that extends radially along a surface of the ring seat.

In addition to one or more of the features described above, or as an alternative, further embodiments may include that the at least one fluid channel is a groove that extends radially along a surface of the piston ring.

In addition to one or more of the features described above, or as an alternative, further embodiments may include that the at least one fluid channel is formed in one of the piston and the piston ring.

In addition to one or more of the features described above, or as an alternative, further embodiments may include a circumferential channel formed in the same of the piston and the piston ring as the at least one fluid channel, the circumferential channel configured increase a surface area on the piston ring that is subject to the second pressure.

In addition to one or more of the features described above, or as an alternative, further embodiments may include a circumferential channel formed in the other of the piston and the piston ring from the at least one fluid channel, the circumferential channel configured increase a surface area on the piston ring that is subject to the second pressure.

According to another embodiment, a method of making a piston configuration is provided. The method includes forming a piston having a ring seat, forming at least one fluid channel in one of the ring seat and a piston ring, disposing the piston ring within the ring seat, and forming a sealing surface between a surface of the piston ring and a surface of the ring seat, the sealing surface formed when a first pressure on a first side of the piston ring is greater than a second pressure on a second side of the piston ring wherein the at least one fluid channel is configured to increase a surface area on the piston ring that is subject to the second pressure.

In addition to one or more of the features described above, or as an alternative, further embodiments may include that the at least one fluid channel is formed as an aperture that extends axially through a portion of the piston.

In addition to one or more of the features described above, or as an alternative, further embodiments may include that the at least one fluid channel is formed as a groove that extends radially along a surface of the ring seat.

In addition to one or more of the features described above, or as an alternative, further embodiments may include that the at least one fluid channel is formed as a groove that extends radially along a surface of the piston ring.

In addition to one or more of the features described above, or as an alternative, further embodiments may include forming a circumferential channel in the same of the piston and the piston ring as the at least one fluid channel, the circumferential channel configured increase a surface area on the piston ring that is subject to the second pressure.

In addition to one or more of the features described above, or as an alternative, further embodiments may include forming a circumferential channel formed in the other of the piston and the piston ring from the at least one fluid channel, the circumferential channel configured increase a surface area on the piston ring that is subject to the second pressure.

Technical effects of embodiments of the present disclosure include a piston system and configuration with an increased axial force applied to a piston ring such that the piston ring may not be unseated during operation.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 3A is a schematic illustration of a piston and piston ring configuration in accordance with an embodiment disclosed herein;

FIG. 3B is a plan view of a portion of the piston of FIG. 3A;

FIG. 3C is a pressure profile schematic illustration of the pressure forces acting on the piston ring of FIG. 3A;

FIG. 4A is a schematic illustration of another embodiment of a piston and piston ring configuration in accordance with the present disclosure;

FIG. 4B is a plan view of a portion of the piston of FIG. 4A; and

DETAILED DESCRIPTION

Figure 1A:
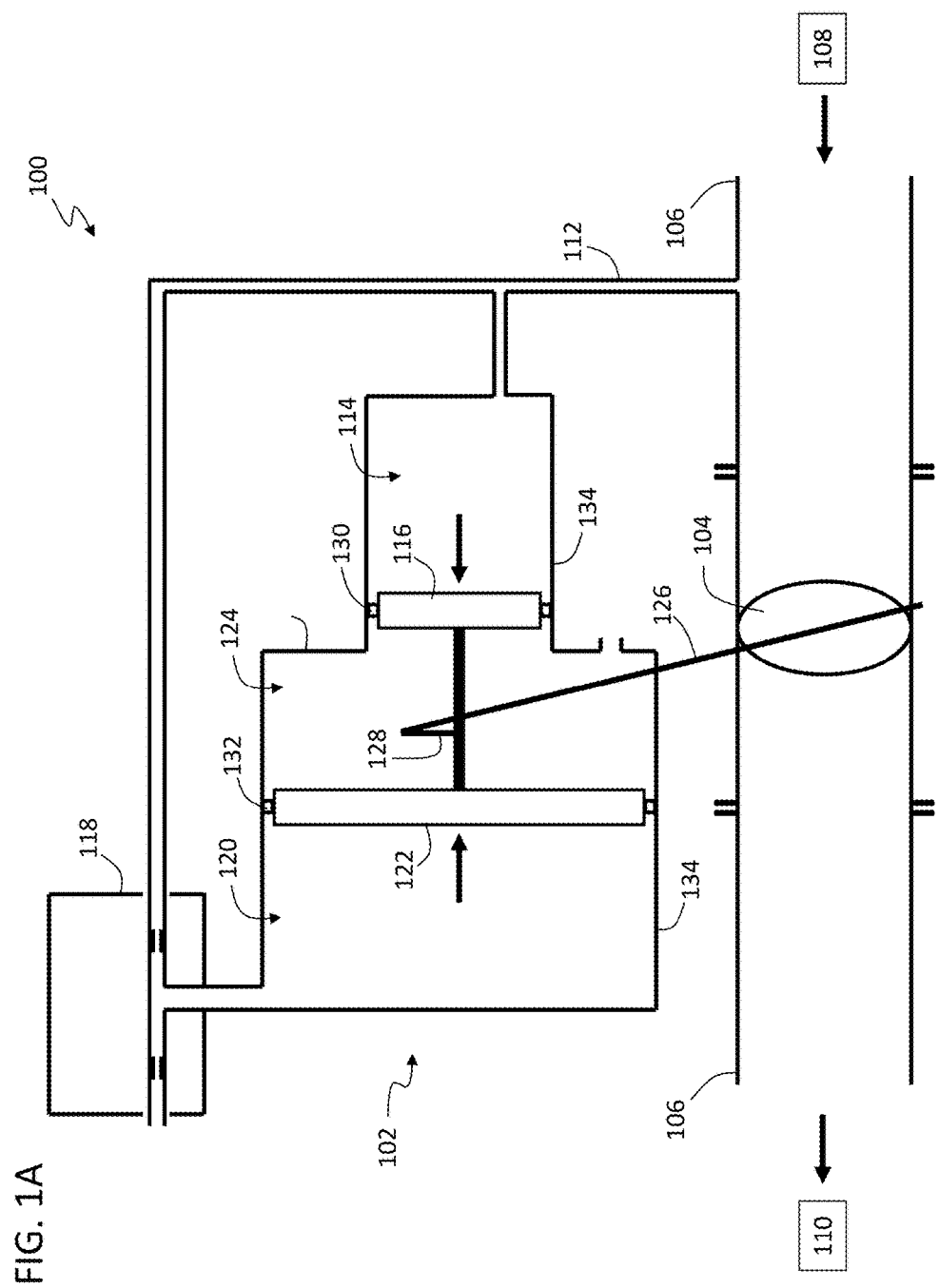
FIG. 1A is a schematic illustration of a system having a piston operable therein.

FIG. 1A is a schematic illustration of a system having a piston operable therein. System 100 includes a piston system 102 that operates by the application of air pressure which is, in part, supplied from a compressor stage of an aircraft engine. Although an aircraft system will be described herein, those of skill in the art will appreciate that the piston system described herein may be applied to other piston-based systems without departing from the scope of the disclosure.

The piston system 102 is configured to operate, control, or drive a valve 104 within a flow path 106. Air may be supplied from a compressor stage 108 of an engine, flow toward the valve 104 which may regulate the flow of the air prior to being supplied to other systems, include environmental control systems, wing anti-ice systems, etc. The valve 104 may be configured as various types of valves including, but not limited to, butterfly valves and inline valves.

To operate the piston system 102, air may be bled from the flow path 106 into a flow line 112 to operate the piston system 102 and thus control the valve 104 based on air pressure within the system 100. The piston system 102 may have a first chamber 114 that may be filled with air having a supply pressure. That is, the pressure of the air in the first chamber 114 may be equal to the pressure of the air supplied from the compressor stage 108 of the engine. The supply pressure of the air in the first chamber 114 may provide a closing force on a first piston 116 of the piston system 102. A portion of the air may also continue along the flow line 112 to a motor 118, such as a torque motor. The motor 118 is configured to supply air having a modulate pressure to a second chamber 120 of the piston system 102. The air in the second chamber 120 may be used to actuate the piston system 102 and open the valve 104 by providing the modulate pressure to a second piston 122.

A third chamber 124 is configured between the first piston 116 and the second piston 122. The third chamber 124 is filled with air having ambient pressure, thus allowing the supply pressure air of the first chamber 114 and the modulated pressure of the second chamber 120 to operate on the pistons 116, 122 and thus operate the valve 104. To enable operation of the valve 104, the piston system 102 is connected to the valve 104 by means of a connecting rod 126. The connecting rod 126 operably connects the valve 104 to a lever arm 128 in the piston system 102.

The pistons 116, 122 are configured to prevent air contamination, leaking, or bleeding between the three chambers 114, 120, 124. To provide a seal, and yet allow the pistons 116, 122 to move within the piston system 102, a first piston ring 130 is provided about the first piston 116 and a second piston ring 132 is provided about the second piston 122.

Figure 1B:
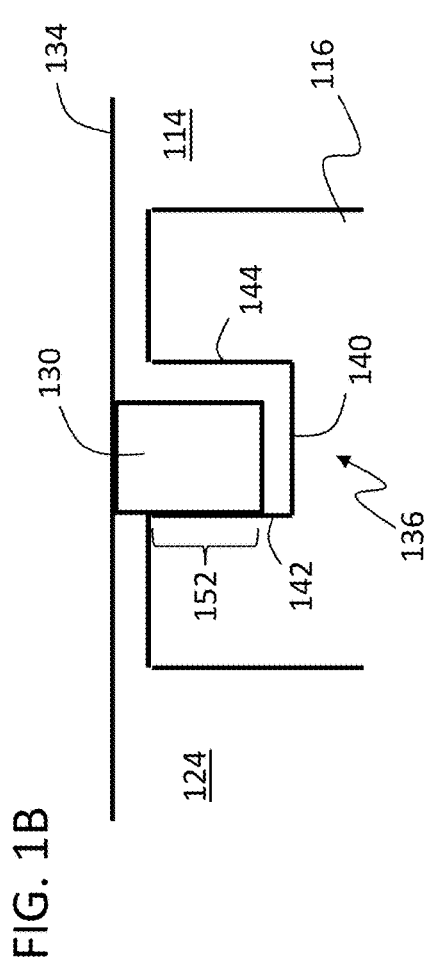
FIG. 1B is a close up view of a piston ring and piston configuration of a piston ring of the system of FIG. 1A.
Figure 1C:
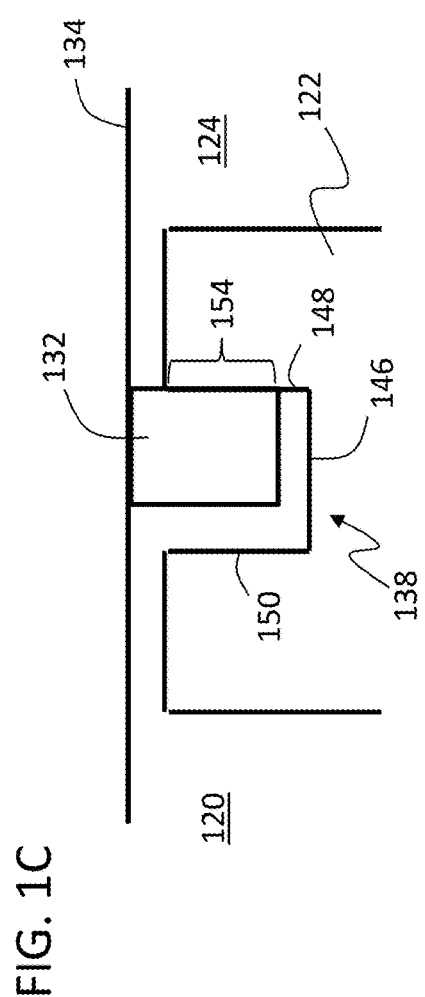
FIG. 1C is a close up view of another piston ring and piston configuration of a piston ring of the system of FIG. 1A.

Turning now to FIGS. 1B and 1C, close-up views of the first piston ring 130 and the second piston ring 132 are shown, respectively. The piston rings 130, 132 are configured to provide a seal between the pistons 116, 122 and a piston wall 134. As shown, the pistons 116, 122 are configured with ring seats 136, 138, respectively. A first ring seat 136 has a base 140, a first side wall 142, and a second side wall 144. A second ring seat 138 has a base 146, a first side wall 148, and a second side wall 150.

As shown, the first piston ring 130 forms a sealing surface 152 between a portion of the first piston ring 130 and the first side wall 142 of the first ring seat 136. Similarly, the second piston ring 132 forms a sealing surface 154 between a portion of the second piston ring 132 and the first side wall 148 of the second ring seat 138. The piston rings 130, 132 engage with the ring seats 136, 138, to form the sealing surfaces 152, 154, as shown because of a pressure difference on either side of the respective piston ring 130, 132. For example, the first piston ring 130 is engaged with the first side wall 142 (left side in FIG. 1B) because of a low pressure in the third chamber 124 and a higher pressure in the first chamber 114. The pressure difference generates an axial force that pushes or forces the first piston ring 130 into the first side wall 142. Similarly, the second piston ring 132 is engaged with the first side wall 148 (right side in FIG. 1C) because of a low pressure in the third chamber 124 and a higher pressure in the second chamber 120 that generates an axial force that pushes or forces the second piston ring 132 into the first side wall 148 of the second ring seat 138.

It will be noted that the ring seats 136, 138 are schematically larger than the size of the piston rings 130, 132. This is configured to allow for the piston rings 130, 132 to thermally expand and wear over time.

In operation, it is desired that if a piston moves during operation, the associated piston ring will move with the piston and maintain seal between the piston and a piston wall. Further, during this movement, it is desired that the sealing surface between the piston ring and the piston ring seat side wall is maintained.

Figure 2A:
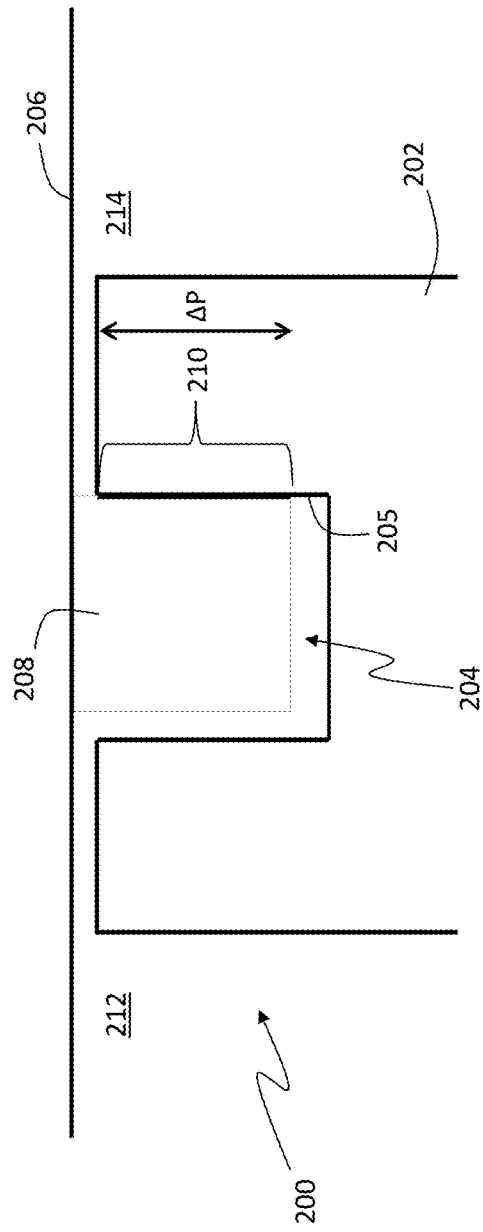
FIG. 2A is a schematic illustration of a prior art configuration of a piston ring within a ring seat of a piston.

Turning to FIG. 2A, a traditional configuration of a piston ring within a ring seat is shown. A piston system 200 is similar to the above described piston system and may be representative of either the first or second piston and associated piston ring shown and described with respect to FIGS. 1A-1C. The piston system 200 includes a piston 202 having a ring seat 204 and located within a piston wall 206. A piston ring 208 is positioned within the ring seat 204 and provides a seal between the piston 202 and the piston wall 206. A sealing surface 210 is formed between a surface of the piston ring 208 and a side wall 205 of the ring seat 204.

The sealing surface 210 is formed in part due to a difference in pressure between a first pressure 212 and a second pressure 214 that are on either side of the sealing surface 210. The first pressure 212 is higher than the second pressure 214, and thus the piston ring 208 forms the sealing surface 210 with the side wall 205 of the ring seat 204. The difference in pressure between the first pressure 212 and the second pressure 214 forms a pressure differential or pressure gradient ΔP along the sealing surface 210.

Figure 2C:
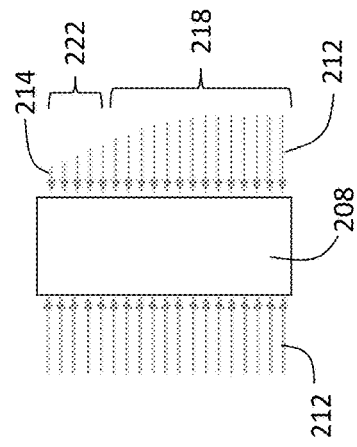
FIG. 2C is a pressure profile schematic illustration of the pressure forces acting on the piston ring of FIG. 2A.
Figure 2B:
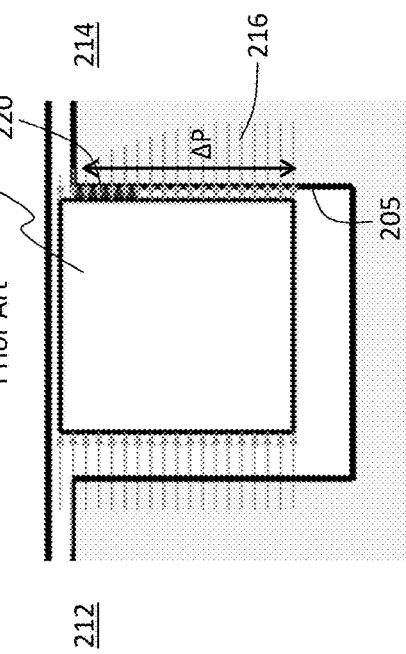
FIG. 2B is a schematic illustration indicating the pressure forces acting on the piston ring of FIG. 2A.

FIG. 2B indicates a pressure profile on the piston ring 208. As shown, on the left side of the piston ring 208, a constant pressure of first pressure 212 is supplied. However, on the right side of the piston ring 208, the pressure gradient ΔP is present, as further indicated by the arrows 216 on the right hand side of piston ring 208.

The piston ring 208 will physically engage and seal with the side wall 205 of the ring seat 204 where the highest pressure difference (between first pressure 212 and second pressure 214) is present. This is indicated as contact portion 220, shown in FIG. 2B, and correlates to the area of highest pressure difference 222 shown in FIG. 2C. The difference in arrow lengths shown in FIG. 2C indicates the amount of force applied to the piston ring 208. That is, FIG. 2C shows the pressure profile, or axial force, applied to the piston ring 208.

As is evident in FIG. 2C, the end result of this configuration is a relatively low pressure force applied to the piston ring 208 and at the outer diameter at contact portion 220 (area 222). This is because part of the right-direction force of the first pressure 212 is offset or canceled by the portion 218, which has a pressure of the first pressure 212. This causes part of the sealing surface to have a pressure of the first pressure 212.

Because of the different pressures 212, 214 and the length of the sealing surface 210 that is exposed to the first pressure 212, the piston ring 208 may rotate or allow for some amount of air from the first pressure 212 side to enter along the sealing surface 210. This is indicated in the pressure profile of FIG. 2C at portion 218. With reference to FIGS. 2B and 2C, the contact portion 220 is present where the highest pressure difference area 222 between forces/pressures on opposite sides of the piston ring 208 is located. That is, where the pressure difference is the greatest the most secure seal between the piston ring 208 and the sealing surface is formed. As shown in FIGS. 2B and 2C, the contact portion 220 is located toward an outer diameter of the piston ring 208.

As a result, the axial force, i.e., the pressure force on the piston ring 208, may be less than or equal to the friction force that exists between the piston ring 208 and the piston wall 206. If the friction force between the piston ring 208 and the piston wall 206 is equal to or greater than the axial force, the piston ring 208 may become unseated from the sealing surface 210, which may result in an air leak through and/or around the piston ring 208. Small amounts of intermittent air leakage across the piston ring 208 can lead to control instabilities in the operation of the device that the piston system 200 is a part of.

Turning to FIGS. 3A and 3B, a configuration of a piston ring and piston in accordance with an embodiment of the present disclosure is shown. A piston system 300 is similar to the above described piston systems and may be representative of either the first or second piston and associated piston ring shown and described with respect to FIGS. 1A-1C. The piston system 300 includes a piston 302 defining a ring seat 304 and is positioned in contact with a piston wall 306. A piston ring 308 is positioned within the ring seat 304 and provides a seal between the piston 302 and the piston wall 306. A sealing surface 310 is formed between a surface of the piston ring 308 and a side wall 305 of the ring seat 304.

The sealing surface 310 is formed in part due to a difference in pressure between a first pressure 312 and a second pressure 314 that are present on opposite sides of the piston ring 308. The first pressure 312 is higher than the second pressure 314 generating an axial force that pushes the piston ring 308 to form the sealing surface 310 with the side wall 305 of the ring seat 304. The difference in pressure between the first pressure 312 and the second pressure 314 forms a pressure differential or pressure gradient ΔP along the sealing surface 310.

As shown in FIGS. 3A and 3B, the piston 302 may include one or more fluid channels 330. The fluid channels 330 may be configured as channels that pass through a portion of the piston 302 from an exterior surface to the side wall 305 of the ring seat 304. In some embodiments, the fluid channels 330 may be apertures or holes that extend axial from the side wall 305 to an exterior surface 311 of the piston 302. The fluid channels 330 are configured to enable air having the second pressure 314 to contact a greater surface area of the piston ring 308 than in other configurations, thus modifying the pressure profiles and thus forces acting on the piston ring 308.

For example, as shown in FIG. 3C, a pressure profile on the piston ring 308 is shown. As shown, on the left side of the piston ring 308, a constant pressure at first pressure 312 is supplied. However, on the right side of the piston ring 308, the pressure gradient ΔP is present, as shown in FIG. 3A.

In contrast to the prior achieved pressure profile (see, FIG. 2C), by incorporating a piston having channels fluidly connected to the sealing surface from a low pressure side, the pressure profile may be modified. As noted above, where the pressure difference is the highest the strongest seal or contact at the sealing surface 310 between the piston ring 308 and the side wall 305 is formed. As shown in FIG. 3C, the low pressure 314 is applied to the piston ring 308 over a much greater surface area of the piston ring 308. This enables a high pressure difference 322 for a substantial surface area of the sealing surface 310. That is, portion 318 (having first pressure 312) is significantly smaller than portion 218 (having first pressure 212) shown in FIG. 2C, enabling a greater axial force to be generated and act upon the piston ring 308.

The fluid channels 330 allow the second pressure 314 to be in fluid contact with a greater surface area of the piston ring 308, and thus a higher pressure difference exists on either side of the piston ring 308, and thus the seal that is achieved between the piston ring 308 and the side wall 305 of the ring seat 304 is improved. As such, when the piston 302 moves, the higher axial force that is generated at the sealing surface 310 will enable the piston ring 308 to move with the piston 302. That is, the pressure difference generates sufficient force to overcome and be greater than a frictional force that exists between the piston ring 308 and a piston wall 306.

In some embodiments, a portion of the side wall 305 of the ring seat 304 that forms the sealing surface 310 with the piston ring 308 may include a circumferential channel 332. The circumferential channel 332, in some embodiments, may have a thickness that is the same as the diameter of the fluid channels 330. The circumferential channel 332 may allow a greater amount of air having the second pressure 314 to fluidly contact a surface of the piston ring 308, thus further modifying or controlling the forces acting on the piston ring 308. The circumferential channel 332 may be adjusted or configured to minimize the number of fluid channels 330 that are formed through the piston 302 and/or to optimize the forces acting on the piston ring 308.

Turning now to FIGS. 4A and 4B, an alternative embodiment in accordance with the present disclosure is shown. The embodiment of FIGS. 4A and 4B may generate a similar pressure (and force) profile to that shown in FIG. 3C, and thus the pressure profile is not repeated herein.

A piston system 400 is similar to the above described piston systems and may be representative of either the first or second piston and associated piston ring shown and described with respect to FIGS. 1A-1C. The piston system 400 includes a piston 402 having a ring seat 404 that is in contact with a piston wall 406. A piston ring 408 is positioned within the ring seat 404 and provides a seal between the piston 402 and the piston wall 406. A sealing surface 410 is formed between a surface of the piston ring 408 and a side wall 405 of the ring seat 404.

The sealing surface 410 is formed in part due to a difference in pressure between a first pressure 412 and a second pressure 414. The first pressure 412 is higher than the second pressure 414 generating an axial force that pushes the piston ring 408 to form the sealing surface 410 with the side wall 405 of the ring seat 404. The difference in pressure between the first pressure 412 and the second pressure 414 forms a pressure differential or pressure gradient ΔP along the sealing surface 410.

As shown in FIGS. 4A and 4B, the piston 402 may include one or more fluid channels 430. The fluid channels 430 may be configured as channels in the side wall 405 of the piston seat 404. In some embodiments, the fluid channels 430 may be grooves that extend from an outer diameter of the piston 402 and along a portion of the side wall 405 of the piston seat 404 where the piston ring 408 will form the sealing surface 410 with the side wall 405. The fluid channels 430 are configured to enable air having the second pressure 414 to contact a greater surface area of the piston ring 408 without allowing the air pressures (412, 414) on either side of the piston ring 408 to mix. Thus, the fluid channels 430 do not extend the full length of the side wall 405.

In some embodiments, the surface of the side wall 405 of the ring seat 404 that includes the fluid channels 430 may also include a circumferential channel, similar to that shown in FIG. 3B. In such an embodiment, the circumferential channel may fluidly connect one or more of the fluid channels 430. The circumferential channel may be configured to allow a greater amount of air having the second pressure 414 to fluidly contact a surface of the piston ring 408.

Figure 5:
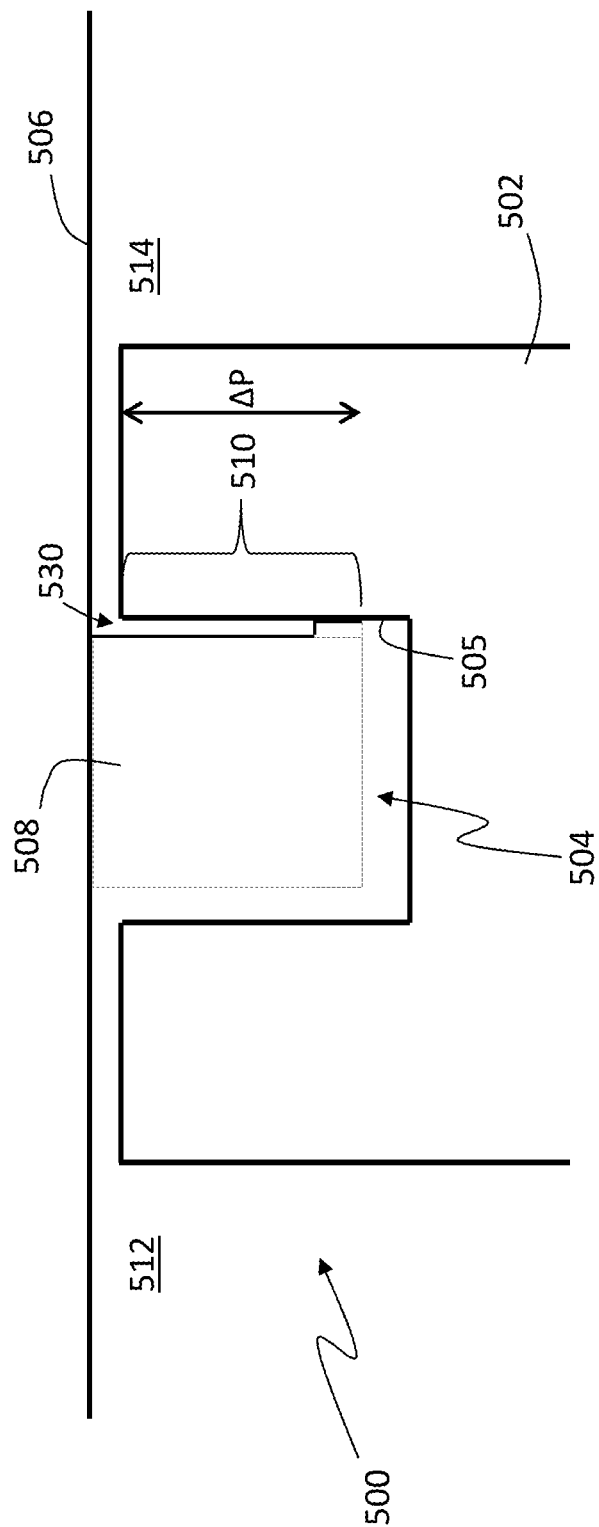
FIG. 5 is a schematic illustration of another embodiment of a piston and piston ring configuration in accordance with the present disclosure.

Turning now to FIG. 5, another alternative embodiment in accordance with the present disclosure is shown. The embodiment of FIG. 5 may generate a similar pressure (and force) profile to that shown in FIG. 3C, and thus the pressure profile is not repeated herein.

A piston system 500 is similar to the above described piston systems and may be representative of either the first or second piston and associated piston ring shown and described with respect to FIGS. 1A-1C. The piston system 500 includes a piston 502 having a ring seat 504 and in contact with a piston wall 506. A piston ring 508 is positioned within the ring seat 504 and provides a seal between the piston 502 and the piston wall 506. A sealing surface 510 is formed between a surface of the piston ring 508 and a side wall 505 of the ring seat 504.

The sealing surface 510 is formed in part due to a difference in pressure between a first pressure 512 and a second pressure 514. The first pressure 512 is higher than the second pressure 514 generating an axial force that pushes the piston ring 508 to form the sealing surface 510 with the side wall 505 of the ring seat 504. The difference in pressure between the first pressure 512 and the second pressure 514 forms a pressure differential or pressure gradient ΔP along the sealing surface 510.

As shown in FIG. 5, the piston ring 508 may include one or more fluid channels 530. The fluid channels 530 may be configured as channels in a wall of the piston ring 508 that is adjacent the sealing surface 510. In some embodiments, the fluid channels 530 may be grooves that extend from an outer diameter of the piston ring 508 and along the wall of the piston ring 508 where the piston ring 508 will form the sealing surface 510. The fluid channels 530 are configured to enable air having the second pressure 514 to contact a greater surface area of the piston ring 508 than in other configurations.

In some embodiments, the surface of the wall of the piston ring 508 that includes the fluid channels 530 may also include a circumferential channel, similar to that shown in FIG. 3B, but formed on a wall of the piston ring 508. In such an embodiment, the circumferential channel may fluidly connect one or more of the fluid channels 530. The circumferential channel may be configured to allow a greater amount of air having the second pressure 514 to fluidly contact a surface of the piston ring 508.

In each of the above described embodiments including the channels to modify the pressure profiles, it will be appreciated that there are structural elements that remain at the sealing surfaces. That is, for example, the channel 330 of FIGS. 3A and 3B does not extend in a circumference (thus forming two separate rings), but rather as shown in FIG. 3B, each of the channels is separated from the other channels, and further, the channels are separated from the edges of the piston 302. This enables structural support to be present between the piston ring 308 and the piston 302 while allowing the additional fluid flow. The embodiments shown in FIGS. 4A-5 retain similar structural elements to support the structure of the piston ring while still enabling a modified pressure profile.

Advantageously, embodiments described herein provide a modified pressure profile that increases the forces acting on a piston ring such that the piston ring will maintain in contact with a piston even during movement of the piston. Embodiments disclosed herein are configured to increase the axial delta pressure such that the pressure difference generates an axial force that forces or pushes a piston ring toward a sealing surface.

Further, advantageously, in accordance with some embodiments, combinations of fluid channels and circumferential channels may be configured to optimize the implementation and minimize the number of fluid channels (particularly if apertures or holes) if desired.

Moreover, advantageously, in accordance with embodiments disclosed herein, leakage across piston rings may be minimized or eliminated. Furthermore, embodiments disclosed herein may provide sufficient loading on a piston ring to prevent relative motion between the piston ring and the piston.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments.

For example, although only a number of embodiments have been presented with respect to the shape, size, number, geometry, and configuration of the fluid channels, those of skill in the art will appreciate that the fluid channels may take on any desired shape, size, number, geometry, and/or configuration. Furthermore, for example, although described herein with the circumferential channel being in the same surface as the fluid channel(s), those of skill in the art will appreciate that the fluid channels may be formed in one of the piston ring and the piston, and the circumferential channel may be formed in the other of the piston ring and the piston.

Accordingly, the present disclosure is not to be seen as limited by the foregoing description, but is only limited by the scope of the appended claims.

What is claimed is:

1. A piston configuration for use in an aircraft engine comprising:
 a piston having a ring seat, the piston operably connected to a high temperature pneumatic valve of the aircraft engine, the valve operable in response to the piston to regulate airflow to aircraft systems;
 a piston ring disposed within the ring seat and configured to form a sealing surface between a surface of the piston ring and a surface of the ring seat, the sealing surface formed when a first pressure on a first side of the piston ring is greater than a second pressure on a second side of the piston ring; and
 at least one fluid channel configured to increase a surface area on the piston ring that is subject to the second pressure,
 wherein the at least one fluid channel is a groove that extends radially along a surface of the ring seat.

2. The piston configuration of claim 1, wherein the at least one fluid channel is an aperture that extends axially through a portion of the piston.

3. The piston configuration of claim 1, wherein the at least one fluid channel is a groove that extends radially along a surface of the piston ring.

4. The piston configuration of claim 1, wherein the at least one fluid channel is formed in one of the piston and the piston ring.

5. The piston configuration of claim 4, further comprising a circumferential channel formed in the same of the piston and the piston ring as the at least one fluid channel, the circumferential channel configured increase a surface area on the piston ring that is subject to the second pressure.

6. The piston configuration of claim 4, further comprising a circumferential channel formed in the other of the piston and the piston ring from the at least one fluid channel, the circumferential channel configured increase a surface area on the piston ring that is subject to the second pressure.

7. A piston system for use in an aircraft engine comprising:
 a piston wall defining an interior chamber;
 a piston located within the piston wall and dividing the interior chamber into a first chamber and a second chamber, the first chamber having a first pressure and located on a first side of the piston and the second chamber having a second pressure located on a second side of the piston, the piston having a ring seat located adjacent to the piston wall and the first pressure being greater than the second pressure, the piston operably connected to a high temperature pneumatic valve of the aircraft engine, the valve operable in response to the piston to regulate airflow to aircraft systems;
 a piston ring disposed within the ring seat and configured to form a seal between the piston ring, the piston wall, and the ring seat; and
 at least one fluid channel configured to increase a surface area on the piston ring that is subject to the second pressure,
 wherein the at least one fluid channel is a groove that extends radially along a surface of the ring seat.

8. The piston system of claim 7, wherein the at least one fluid channel is an aperture that extends axially through a portion of the piston.

9. The piston configuration of claim 7, wherein the at least one fluid channel is a groove that extends radially along a surface of the piston ring.

10. The piston configuration of claim 7, wherein the at least one fluid channel is formed in one of the piston and the piston ring.

11. The piston configuration of claim 10, further comprising a circumferential channel formed in the same of the piston and the piston ring as the at least one fluid channel, the circumferential channel configured increase a surface area on the piston ring that is subject to the second pressure.

12. The piston configuration of claim 10, further comprising a circumferential channel formed in the other of the piston and the piston ring from the at least one fluid channel, the circumferential channel configured increase a surface area on the piston ring that is subject to the second pressure.

13. A method of making a piston configuration for use in an aircraft engine, the method comprising:
 forming a piston having a ring seat;
 forming at least one fluid channel in one of the ring seat and a piston ring;
 disposing the piston ring within the ring seat, and
 forming a sealing surface between a surface of the piston ring and a surface of the ring seat, the sealing surface formed when a first pressure on a first side of the piston ring is greater than a second pressure on a second side of the piston ring wherein the at least one fluid channel is configured to increase a surface area on the piston ring that is subject to the second pressure; and
 operably connecting the piston to a high temperature pneumatic valve of the aircraft engine, the valve operable in response to the piston to regulate airflow to aircraft systems,
 wherein the at least one fluid channel is formed as a groove that extends radially along a surface of the ring seat.

14. The method of claim 13, wherein the at least one fluid channel is formed as an aperture that extends axially through a portion of the piston.

15. The method of claim 13, wherein the at least one fluid channel is formed as a groove that extends radially along a surface of the piston ring.

16. The method of claim 13, further comprising forming a circumferential channel in the same of the piston and the piston ring as the at least one fluid channel, the circumferential channel configured increase a surface area on the piston ring that is subject to the second pressure.

17. The method of claim 13, further comprising forming a circumferential channel formed in the other of the piston and the piston ring from the at least one fluid channel, the circumferential channel configured increase a surface area on the piston ring that is subject to the second pressure.

* * * * *